US006526166B1

(12) United States Patent
Gorman

(10) Patent No.: US 6,526,166 B1
(45) Date of Patent: Feb. 25, 2003

(54) USING A REFERENCE CUBE FOR CAPTURE OF 3D GEOMETRY

(75) Inventor: Chris L. Gorman, Portland, OR (US)

(73) Assignee: Intel Corporation

( * ) Notice: Subject to any disclaimer, the term of this patent is extended or adjusted under 35 U.S.C. 154(b) by 0 days.

(21) Appl. No.: 09/474,335

(22) Filed: Dec. 29, 1999

(51) Int. Cl.$^7$ ................................................ G06K 9/00
(52) U.S. Cl. ...................................... 382/154; 345/427
(58) Field of Search ................................ 382/154, 131; 345/418, 419, 424, 427, 441; 348/42, 43; 356/12

(56) References Cited

U.S. PATENT DOCUMENTS

| 5,898,793 A | * | 4/1999 | Karron et al. | ............... | 382/131 |
| 6,128,405 A | * | 10/2000 | Fujii | ........................... | 382/154 |
| 6,384,826 B1 | * | 5/2002 | Bern et al. | ................... | 345/441 |

OTHER PUBLICATIONS

Ref. cited from J.D. Foley & A. Van Dam, Fundamentals of Graphics Interactive Computer Graphics, Viewing in Three Dimensions (The Systems programming series) pp. 274–277, *Copyright 1982 by Addison–Wesley Publishing Company, Inc. Philippines Copright 1192 by Addison–Wesley Publishing Company, Inc.*
Ref. cited from Proceedings of 1994 ARPA Image Understanding Workshop, A Sequential Factorization Method for Recovering Shape and Motion from Image Streams, 'Toshihiko Morita & Takeo Kanade, School of Computer Science Carnegie Mellon University Pittsburgh, PA 15213, 1994, Monterey CA vol. II pp. 1177–1188.

Carlo Tomasi, Takeo Kanade, "Shape and Motion from Image Streams under Orthography a Factorization Method", International Journal of Computer Vision, 9:2, pp. 137–154 (1992) Kluwer Academic Plublishers, Manufactured in The Netherlands.
Conrad J. Poelman & Takeo Kanade, Extension to Scaled Orthography & Paraperspective Projection, "A Paraperspective Factorization Method for Shape and Motion Recovery", CMU–CS School of Computer Science, Carnegie Mello University, Pittsburgh, Pennsylvania 15213–3890, Oct. 1992.
Toshihiko Morita & Takeo Kanade, "A Sequential Factorization Method for Recovering Shape & Motion from Image Streams", Proceedings of 1994 ARPA Image Understanding Workshop, Nov., 1994, Monterey CA vol. II pp. 1177–1188, School of Computer Science Carnegie Mello University Pittsburgh, PA 15213.

* cited by examiner

*Primary Examiner*—Joseph Mancuso
*Assistant Examiner*—Vikkram Bali
(74) *Attorney, Agent, or Firm*—Blakely, Sokoloff, Taylor & Zafman LLP

(57) ABSTRACT

The projected edge vectors from a viewpoint to a video image of the reference object on a projection plane are determined. The reference object has three orthogonal edges, and the projected edge vectors correspond to edge vectors of the reference object. The orthonormal basis vectors for subspaces are generated using the projected edge vectors and a vector from the viewpoint to an intersection of the projected edge vectors. The directions of the edge vectors corresponding to the projected edge vectors are calculated. The distance between the reference object and the viewpoint is calculated. Using this distance, the coordinates of the reference object are determined.

30 Claims, 7 Drawing Sheets

USING A REFERENCE CUBE FOR CAPTURE OF 3D GEOMETRY

FIELD OF THE INVENTION

The present invention relates generally to field of computer vision. More specifically, the present invention is directed to a method using a reference cube for capturing 3D geometry.

BACKGROUND

The use of a series of images from a video camera to determine 3D geometry is known in the field of computer vision as the shape from motion problem. Shape from motion is divided into two more fundamental problems such as determining point correspondence, and the application of shape from motion algorithms. Current shape from motion algorithms uses orthographic factorization or nonlinear optimization techniques. The factorization methods use orthogonal projection models. Since a video camera image is clearly a perspective view, these methods are limited to capturing far away objects where the effects of perspective are diminished. The nonlinear optimization methods are iterative and require good initial estimates in order to ensure convergence, thus these methods may not be suitable for real time applications.

SUMMARY OF THE INVENTION

The projected edge vectors from a viewpoint to a video image of the reference object on a projection plane are determined. The reference object has three orthogonal edges, and the projected edge vectors correspond to edge vectors of the reference object. The orthonormal basis vectors for subspaces are generated using the projected edge vectors and a vector from the viewpoint to an intersection of the projected edge vectors. The directions of the edge vectors corresponding to the projected edge vectors are calculated. The distance between the reference object and the viewpoint is calculated. Using this distance, the coordinates of the reference object are determined.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

Figure 1:
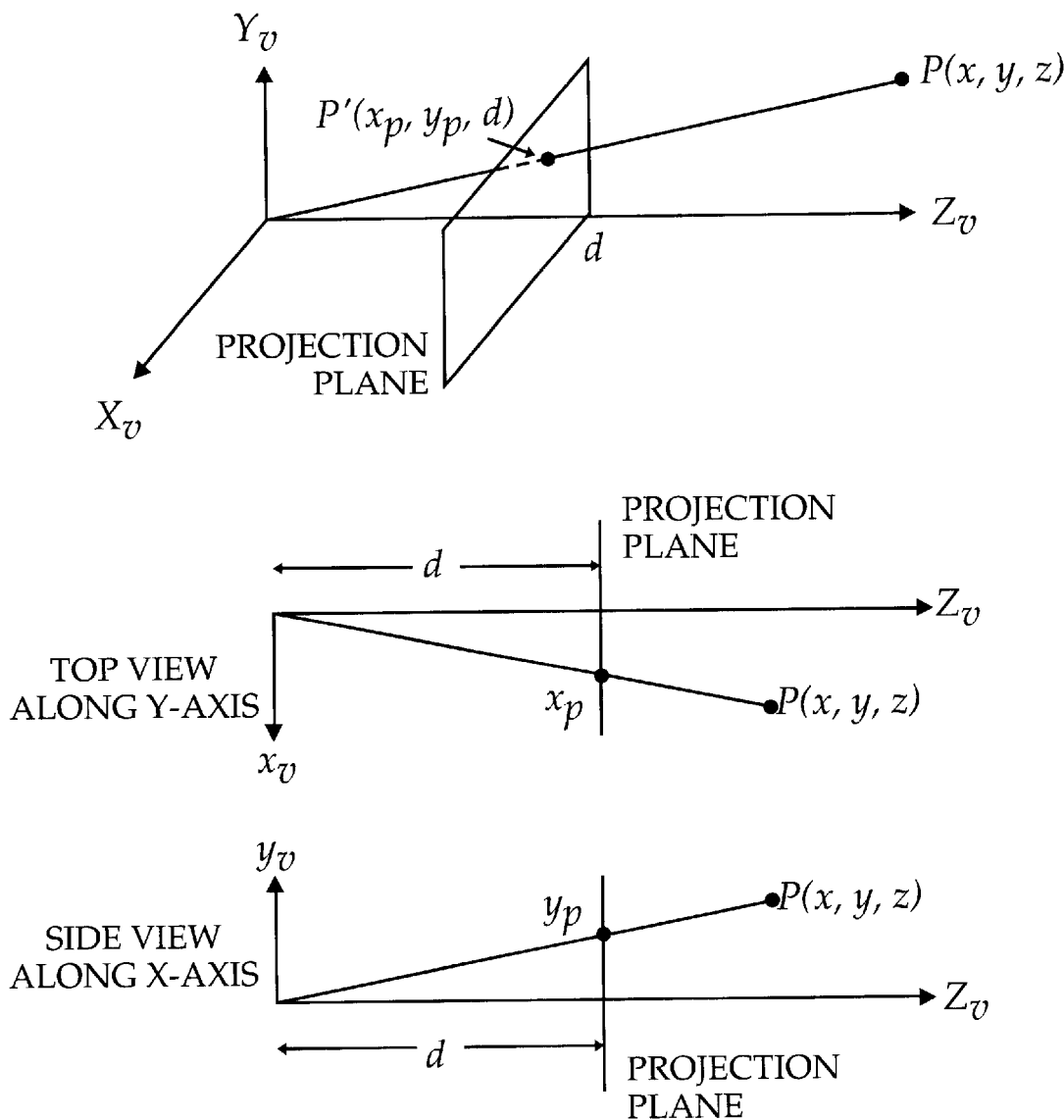
FIG. 1 illustrates a perspective projection.

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

In the present invention, a method of and an apparatus for determining the translation and orientation of the camera, or camera vectors, using a reference object of known dimensions and shape is disclosed. In one embodiment, a real video image of a physical reference object with three orthogonal edges, for example, a cube, is used. It will be apparent to those of ordinary skill in the art that other reference objects having three orthogonal edges may also be used. In the present embodiment, the sides of the reference cube are colored blue, orange, and green, with identical colors on opposite ends. At any moment, the perspective projection of the reference cube onto a projection plane shows at most three front faces. This color configuration provides that, regardless of the projection angle, each front face will have a unique color. A camera vector algorithm uses these colors to find and identify the edges of the cube. The edges are made distinct by tagging them with the adjacent face colors, for example, an edge between the blue and orange face is called the blue-orange edge. An edge finding algorithm searches for all edges in the video image. In one embodiment, the algorithm searches for edges that have the following properties: 1) are linear, 2) is the result of a contrast between 2 of the 3 colors of the reference cube, and 3) all converge to a single point (the cube corner closest to camera). The edges of the cube and the known dimensions are used to compute the camera vectors relative to the cube. The camera vectors are solved using a perspective projection model.

In perspective projection, there is a viewpoint or camera position and a projection plane. Suppose the camera position is at $(0,0,d)$, where d is the focal distance, and the projection plane is parallel to the x-y plane at $z=0$. Since the camera position has a positive z, points on the reference object will have negative z values. Then, using similar triangles to write the ratios, the projection of a point P (x,y,z) onto the projection plane is a point P' having $x_p$, and $y_p$ coordinates of $$\frac{x_p}{d} = \frac{x}{d-z}$$
$$x_p = \frac{dx}{d-z}$$
$$\frac{y_p}{d} = \frac{y}{d-z}$$
$$y_p = \frac{dy}{d-z}$$

FIG. 1 illustrates a perspective projection. The distance of d is just a scale factor applied to $x_p$ and $y_p$. The division by z is what causes the perspective projection of more distant objects to be smaller than that of closer objects. Note that all values of z are allowable, except for $z=d$. Points can be behind the center of projection on the positive z-axis or between the center of projection and the projection plane.

Figure 2A:
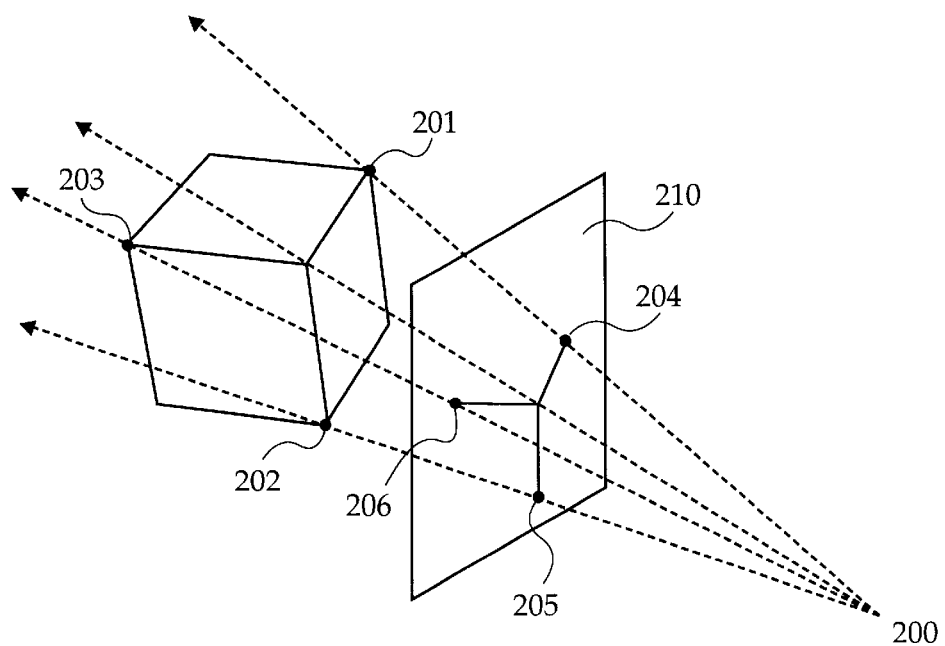
FIG. 2A is a diagram illustrating an implementation of perspective projection.

FIG. 2A is an exemplary diagram illustrating one implementation of the perspective projection in the present invention. The center of projection is at the camera position 200. The projection of the three end points 201, 202, and 203 of the cube provides the three projected points 204, 205 and 206 on the projection plane 210.

Figure 2B:
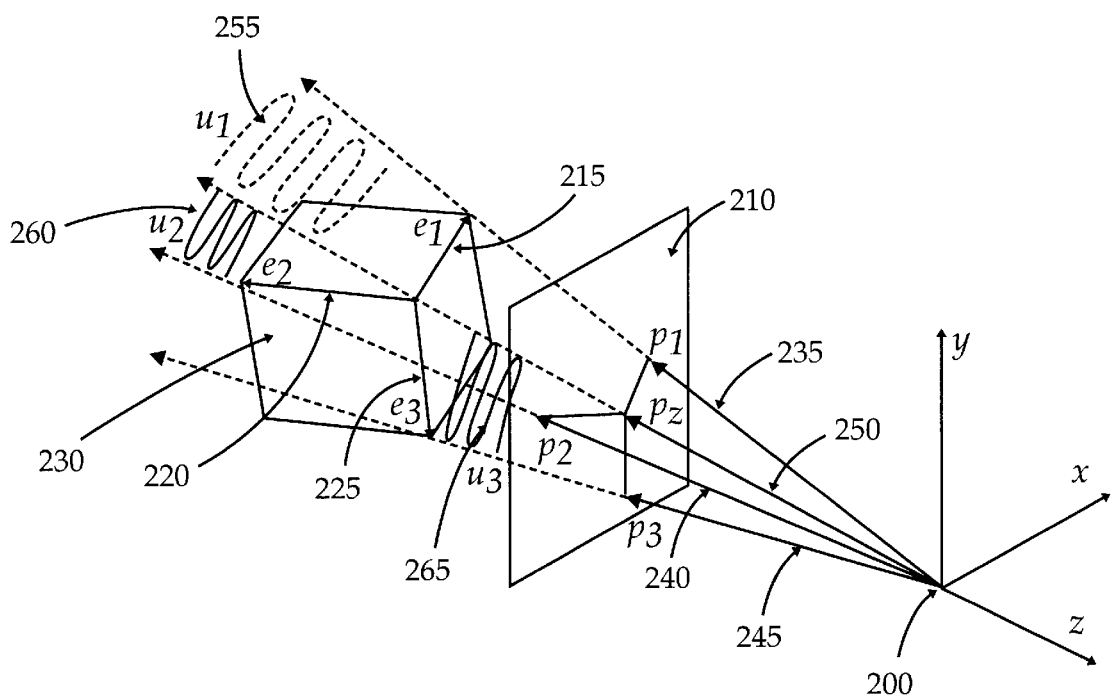
FIG. 2B is a diagram illustrating an exemplary implementation of perspective projection with subspaces and orthonormal vectors.

FIG. 2B is an exemplary diagram of the perspective projection showing the subspaces and the orthonormal vectors as used in the present invention.

The position of the camera 200 is set to be at the focal distance f from the origin. The projection plane 210 is located at the origin. In one embodiment, the directions of three orthonormal (orthogonal and normal) edge vectors, $e_1$, 215, $e_2$ 220, and $e_3$ 225 that represent the edges of the reference cube 230 are computed from the projected edge vectors p1 235, p2 240, and p3 245 using the following steps. Each edge vector has a projected edge vector on the projection plane 210. The edge finding algorithm searches for all edges in a video image.

The algorithm then searches for edges that have the following properties: 1) are linear, 2) is the result of a contrast between 2 of the 3 colors of the reference cube, and 3) all converge to a single point (the cube corner closest to camera). Using the projected edge vectors, $p_1$ 235, $P_2$ 240, and $p_3$ 245, and the vector constructed from the camera position 200 to the intersection of the projected edge vectors, $p_z$ 250, the orthonormal basis vectors for three subspaces, $U_1$ 255, $U_2$ 260, $U_3$ 265 are generated. The subspaces $U_1$ 255, $U_2$ 260, $U_3$ 265 are useful because each edge vector $e_1$ 215, $e_2$ 220, and $e_3$ 225 on the cube lies within its corresponding subspace and can be written as a linear combination of its corresponding basis vectors. The concept of subspaces and orthogonal vectors in linear algebra should be apparent to those of ordinary skill in the art.

The present embodiment models the reference cube as three orthonormal vectors (axis), two of which are constrained to the subspaces. The third axis is computed as a cross product of the other two axes. The subspaces are determined from the four points processed from a video frame. As the first axis rotates within its subspace, the second axis rotates within its subspace and the third axis moves closer or farther from its target subspace. When the distance of the third axis from its subspace is zero, the original coordinates are found.

Referring to FIG. 2B, using the subspaces $U_1$ 255, $U_2$ 260, $U_3$ 265, a function can be generated. This function has one parameter, theta, which is an angle from the z-axis vector. The function constructs an edge vector in $U_1$ that has this angle from the z-axis. The edge vector in $U_2$ that is orthogonal to the edge vector in $U_1$ is constructed. The third edge vector that is orthogonal to both vectors in $U_1$ and $U_2$ is computed using the cross product. The third edge vector may or may not lie in the subspace $U_3$. A numerical method for finding the root of a nonlinear equation is applied to find the root of f( ), where f(theta)=distance of third edge vector to subspace U3. In one embodiment, the angle where this third edge vector is in $U_3$ is found using a modified secant method. The solution contains the directions of the three edge vectors that represent the edges of the cube. The magnitude of the projected edge vectors is used to compute the distance between the cube and the camera.

In one embodiment, we define a system containing the camera vectors and the reference object vectors. The camera vectors are the camera position at $(0,0,d)$ and projection plane horizontal vector $(1, 0, 0)$ and up vector $(0, 1, 0)$. The system is translated such that the reference object vector a (reference object origin) is at the origin $(0,0,0)$. Then we rotate the system so that the reference object vectors align with the standard basis. The resulting translated and rotated camera vectors represent the camera position and orientation relative to the reference object.

Figure 3:
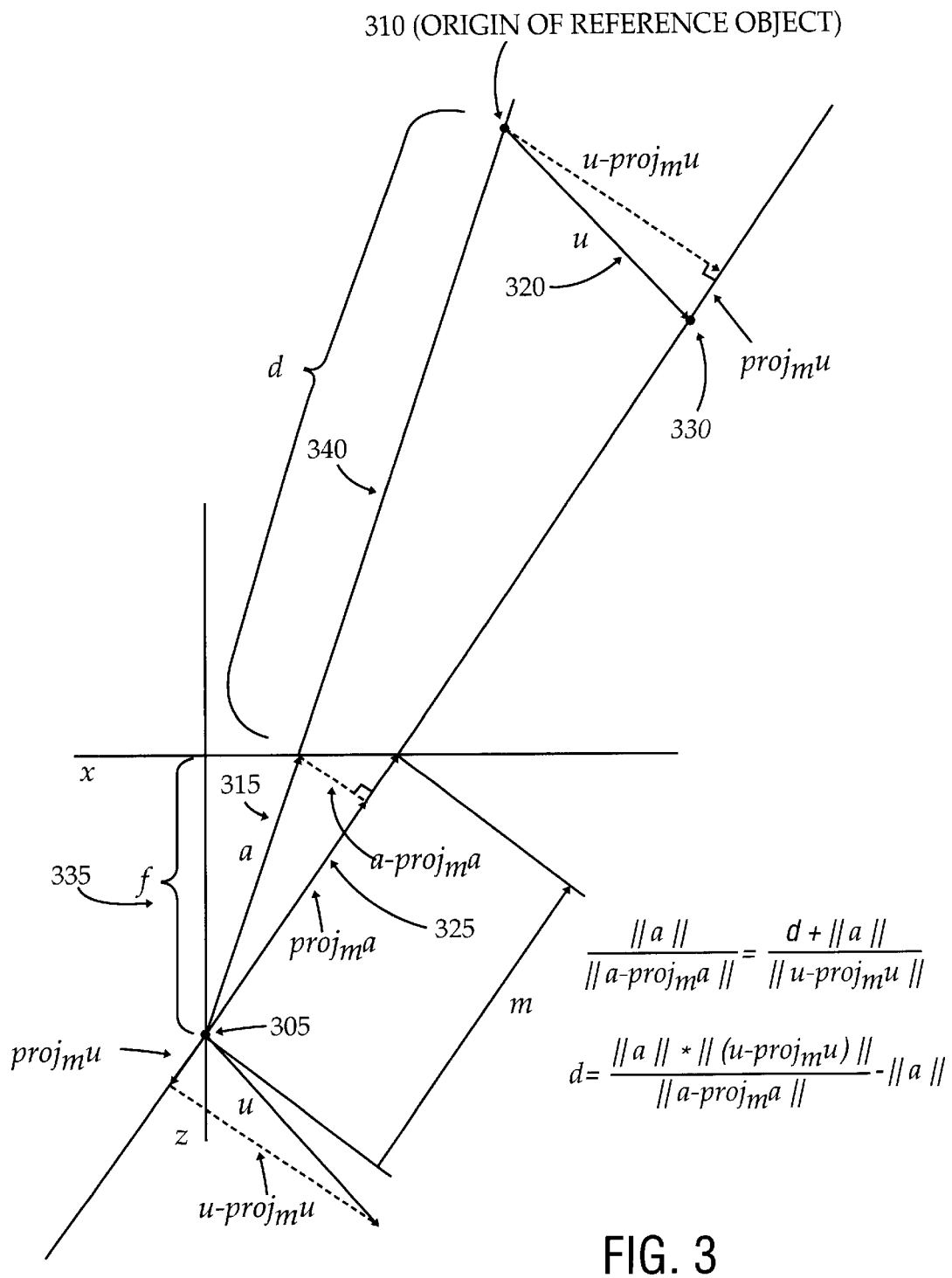
FIG. 3 is a diagram illustrating an exemplary method of finding the distance from the center of projection to the origin of the reference object.

FIG. 3 is an exemplary diagram illustrating an approach in calculating the distance of the reference object from the center of projection. This diagram is shown looking down along the y axis. The x and z axis of the standard basis are labeled as x and z. The projection plane is along the x and y axis. The center of projection (cop) 305 is at the base of the vector a 315. The origin of the reference object is at 310. The vector a 315 is a vector from the cop 305 to the origin of the reference object 310. The vector u 320 is a vector from the reference object origin 310 along one of the reference object edges (the edge that is the farthest away from being collinear with vector a 315 is chosen). The vector m 325 is the vector from the cop 305 to the reference object edge point 330. The distance f 335 is the focal distance of the camera. The projections of the vector u and the vector a are used to produce similar triangles. The properties of similar triangles are used to determine the distance d 340 using the following formulas:

$$\frac{\|a\|}{\|a - proj_m a\|} = \frac{d + \|a\|}{\|u - proj_m u\|}$$

$$d = \frac{\|a\| * \|(u - proj_m u)\|}{\|a - proj_m a\|} - \|a\|$$

Figure 4:
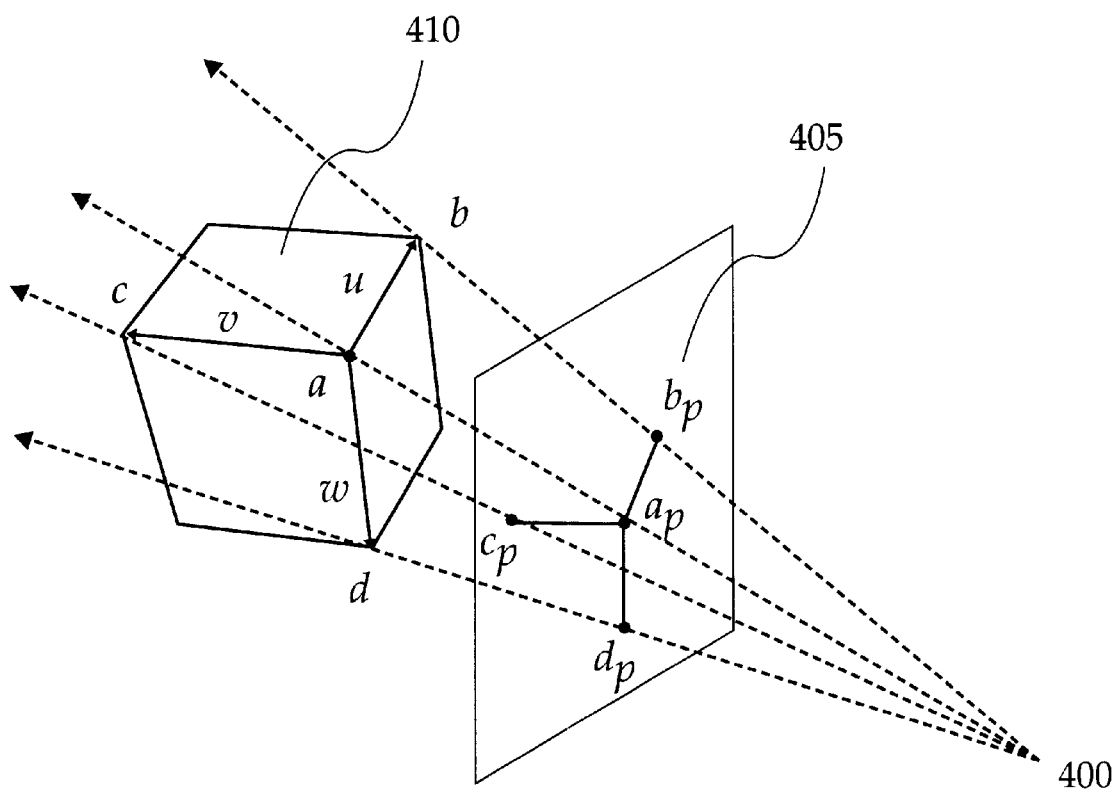
FIG. 4 is a diagram illustrating an exemplary demonstration model.

The effectiveness of this method is confirmed through the following exemplary demonstration model. FIG. 4 is an exemplary diagram as used by the demonstration model. Let the position of the camera 400 be set at (0, 0, 10) and the projection plane 405 be at the origin. Using the cube 410 as the reference object, take the center point a and three end points b, c, and d of the reference cube and project them onto the 2D plane 405 using a perspective projection of focal distanced f=10. The four projected points on the projection plane 405 that corresponds to the points on the reference cube 410 are $a_p, b_p, c_p$, and $d_p$ respectively, where $a_p$ is the projected intersecting point.

Figure 5:
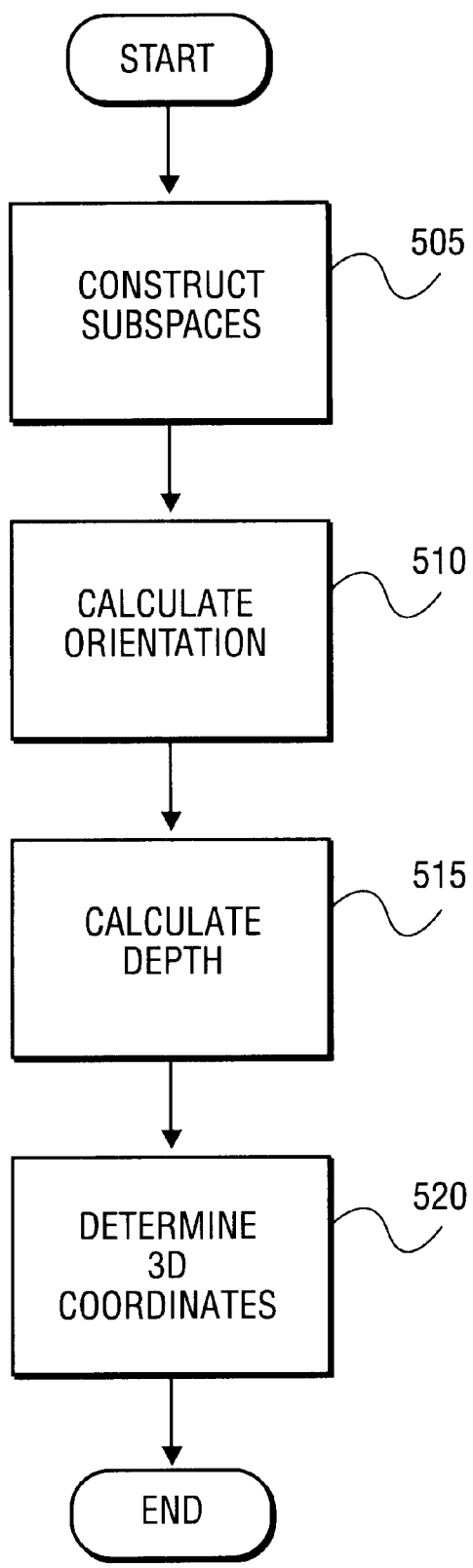
FIG. 5 is an exemplary flow chart of a vector algorithm.

FIG. 5 is an exemplary flow chart of a vector algorithm in accordance with the method of the present invention. In the demonstration model, select the center a of the reference object and the three end points b, c, and d of the reference object to have the following (x,y,z) coordinates:
a=5.00 5.00 −5.00 (center point or the origin of the reference object)
b=6.00 5.00 −5.00 (corner point 1 or the x-axis of the reference object)
c=5.00 6.00 −5.00 (corner point 2 or the y-axis of the reference object)
d=5.00 5.00 −4.00 (corner point 3 or the z-axis of the reference object).
Using the following projection formulas $$a_p = \left(\frac{fa_1}{f - a_3}, \frac{fa_2}{f - a_3}\right)$$

$$b_p = \left(\frac{fb_1}{f - b_3}, \frac{fb_2}{f - b_3}\right)$$

$$c_p = \left(\frac{fc_1}{f - c_3}, \frac{fc_2}{f - c_3}\right)$$

the corresponding four projected points on the projection plane have the following (x,y) coordinates:
$a_p$=3.33 3.33 where point $a_p$ is the projected center point.
$b_p$=4.00 3.33 where point $b_p$ is the projected corner point 1.
$c_p$=3.33 4.00 where point $c_p$ is the projected corner point 2.
$d_p$=3.57 3.57 where point $d_p$ is the projected corner point 3.
In this demonstration model, the four projected points $a_p, b_p, c_p$, and $d_p$ on the projection plane are used as the input for the algorithm of FIG. 5 which solves for the original points of the reference cube.

Referring to FIG. 5, at step 505, the subspaces are constructed. In this step, the system is translated such that the center of projection is on the origin. The points ma, mb, mc, and md are translated points of the corresponding projected points $a_p, b_p, c_p$, and $d_p$. This provides:
ma=3.33 3.33 −10.00 where ma=($a_p$,0)−(0,0,f), the center point
mb=4.00 3.33 −10.00 where mb=$b_p$−f, the corner point 1
mc=3.33 4.00 −10.00 where mc=$c_p$−f, the corner point 2
md=3.57 3.57 −10.00 where md=$d_p$−f, the corner point 3
The translated center point ma is normalized to get:
ma=0.302 0.302 −0.905.
Then, we construct the orthonormal basis for each subspace. Using the formula for projection of v onto u or proj (u,v)=((v DOT u)/(u DOT u))*u, we project the mb vector onto ma, subtract result from mb, and normalize the result to get
mb=0.953 −0.095 0.286 where mb=normalize(mb−proj(ma, mb)).
Similarly,
mc=−0.095 0.095 0.286 where mc=normalize(mc−proj(ma, mc)).
md=0.640 0.640 0.426 where md=normalize(md−proj(ma, md)).
At step 510, the orientation is calculated. We use a modified Secant method to find r where f(r)=1. f(r) is defined as follows.
Compute vector u on the {a,b} subspace
u=0.302 0.203 −0.905 where u=(ma*r)+(sqrt(1−r*r)*mb)
The length of u should be 1.
Compute vector v orthogonal to u on the {a,c} subspace
v=−0.095 0.953 0.286
The length of v should be 1 and u·v should be zero (orthogonal).
Use the cross product of u and v to find w
w=0.949 −1.388 0.316
The length of w should be 1.
Then we find p, the projection of w onto the {a,d} subspace
=0.474 0.474 0.316
The dot product of w and p is the angle of w from the {a,d} subspace
f(r)=0.550
Using numerical techniques we find that f(0.302)~=1.
The u, v, and w from above with r=0.302 is
mu=1.000 −2.200 6.598
mv=2.200 1.000 −6.598
mw=−6.598 6.598 1.000
At step 515, the depth is calculated using the approach as illustrated in FIG. 3. Base depth calculation off the axis whose projection is the longest.
(b−a) was the longest length.
m=b
u=mu
Make u the known length of reference object
u*reference object size
reference object size=1.00
u=1.00 −2.200 6.598
Compute projectors a and r
a=a−f
m=m−f
a=3.33 3.33 −10.00
m=4.00 3.33 −10.00
Determine projection p of u onto m
p=0.126 0.109 −0.315
Determine portion p2 of u orthogonal m
p2=u−p;
p2=0.874 −0.105 0.315
Determine projection q of a onto m
q=3.916 3.263 −9.790
Determine portion q2 of a orthogonal m
q2=a−q
q2=−0.583 0.070−0.210
Determine length of vector a
lenA=11.055

Determine length of vector p2
lenP2=0.935
Determine length of vector q2
lenQ2=0.623
Compute distance d using similar triangles
depth=(lenA*lenP2)/lenQ2−lenA;
depth=5.528
At step 520, the final 3D coordinates are determined.
b=mu*ref obj size
c=mv*ref obj size
d=mw*ref obj size
b=1.000 −2.200 6.598
c=2.200 1.000 −6.598
d=−6.598 6.598 1.000
Here we combine the following steps into one offset vector and then add vector to the reconstructed reference object points. First, we translate the reconstructed reference object to a (point where a is projected onto the x-y axis). Second, we translate by the distance depth in the direction of a. This provides:
o=(ma*depth)+a
o=5.00 5.00 −5.00
Therefore, we have:
a=o
b=b+o
c=c+o
d=d+o
this provides:
a=5.00 5.00 −5.00 where a is the reconstructed center point.
b=6.00 5.00 −5.00 where b is the reconstructed corner point 1.
c=5.00 6.00 −5.00 where c is the reconstructed corner point 2.
d=5.00 5.00 −4.00 where d is the reconstructed corner point 3.

The points a, b, c, and d now contain the final reconstructed 3D points of the reference object center and the three outside end points.

Figure 6:
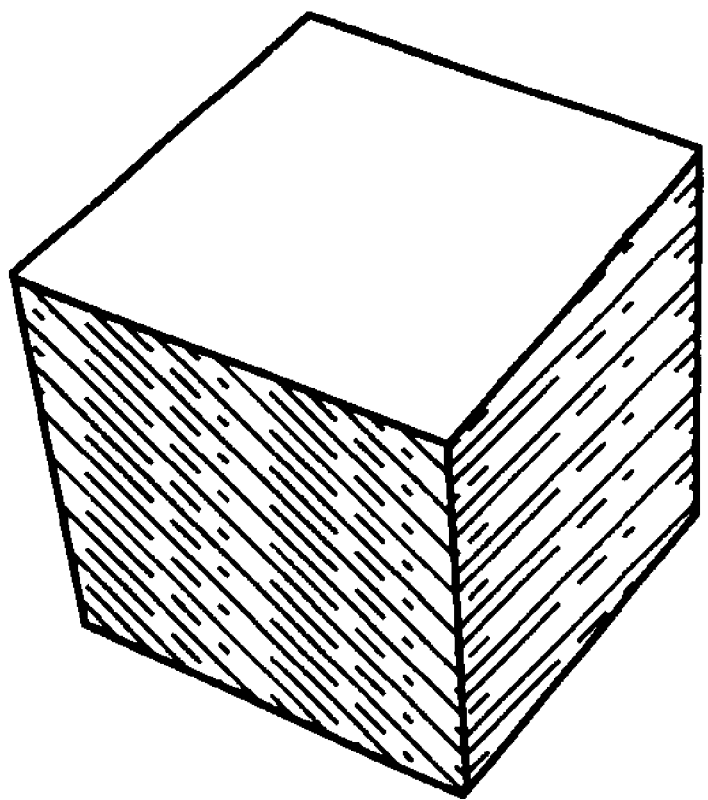
FIG. 6 illustrates an exemplary image of a reference cube.

In one embodiment, the reference cube in the present invention can be used to determine the three dimensional shape of objects located near the reference cube. Using two frames of video, a point correspondence algorithm can be applied to determine surface features common to both video frames. Then the camera vectors obtained from the reference cube are used to determine the depth of the surface features. The depth maps from each frame are then combined to form a 3D model with the origin being at the reference object. Expressing the 3D points relative to a reference object simplifies the process of stitching together the 3D points from multiple frames. This method works with perspective images and can be computed in real time. FIG. 6 is an image of an exemplary reference cube that can be used with the present invention.

In another embodiment, the camera vectors can be used in a 3D mouse. The reference cube could be mounted on a stick, and the user would then move the reference cube in order to rotate, translate, and scale 3D models on the screen.

In another embodiment, the camera vectors can also be used for camera tracking when combining real world video with a virtual world overlay. The real world video is usually obtained by video-capturing an actor in front of a blue screen. The computer can then overlay the actor on the virtual world. When a video camera is moved, the same viewpoint changes are expected to occur in the virtual world. This can be achieved using the camera vectors of the present invention.

Figure 7:
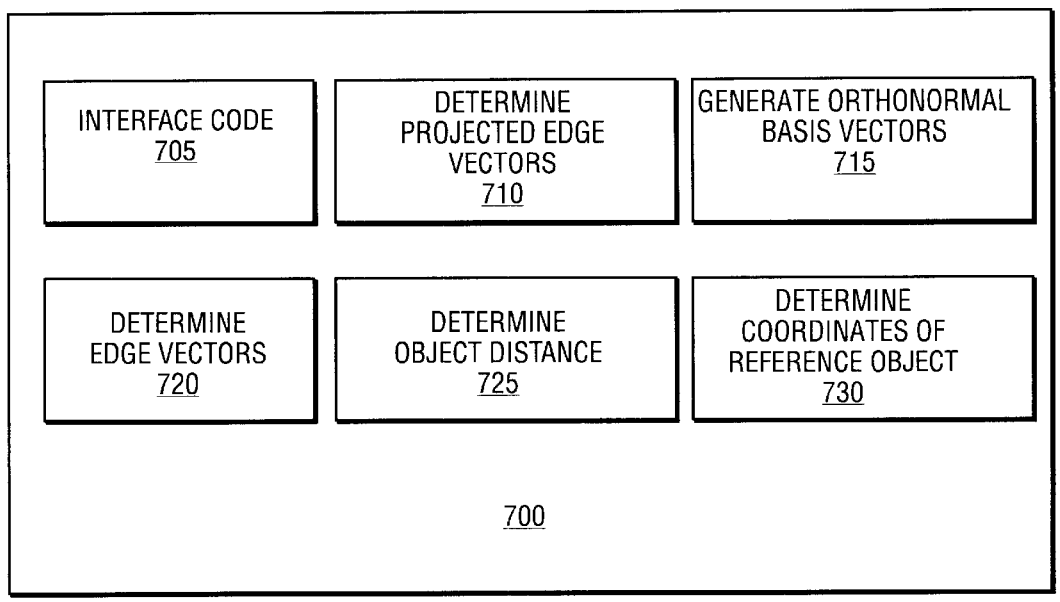
FIG. 7 is a diagram illustrating an exemplary computer readable medium.

FIG. 7 illustrates an embodiment of a computer-readable medium 700 containing various sets of instructions, code sequences, configuration information, and other data used by a computer or other processing device. The embodiment illustrated in FIG. 7 is suitable for use with the vector algorithm described above in FIG. 5. The various information stored on medium 700 is used to perform various data processing operations, such as, for example, determine projected edge vectors 710, generate orthonormal basis vectors 715, determine edge vectors 720, determine distance between the reference object and the viewpoint 725, and determine coordinates of the reference object 730. Computer-readable medium 700 is also referred to as a processor-readable medium. Computer-readable medium 700 can be any type of magnetic, optical, or electrical storage medium including a diskette, magnetic tape, CD-ROM, memory device, or other storage medium.

Computer-readable medium 700 includes interface code 705 that controls the flow of information between various devices or components in the computer system. Interface code 705 may control the transfer of information within a device (e.g., between the processor and a memory device), or between an input/output port and a storage device. Additionally, interface code 705 may control the transfer of information from one device to another.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method, comprising:
   determining projected edge vectors from a viewpoint to a video image of a reference object on a projection plane, the reference object having three orthogonal edges, the projected edge vectors corresponding to edge vectors of the reference object;
   generating orthonormal basis vectors for subspaces using the projected edge vectors and a vector from the viewpoint to an intersection of the projected edge vectors;
   calculating directions of the edge vectors corresponding to the projected edge vectors;
   calculating distance between the reference object and the viewpoint; and
   determining coordinates of the reference object using the distance between the reference object and the viewpoint.

2. The method of claim 1 wherein the reference object is a cube having three edge vectors.

3. The method of claim 2 wherein a face of the reference cube has one of three different colors, and wherein the adjacent faces have different colors.

4. The method of claim 1 further comprising searching all edges in the video image for edges that correspond to the edges of the reference object.

5. The method of claim 4 wherein searching for the edges of the reference object comprises searching for edges being linear, edges resulting from a contrast between two of the three colors of the reference cube, and edges converging to a single point, and wherein the converging point is a corner of the reference cube being closest to the viewpoint.

6. The method of claim 1 wherein the edge vector lies within the corresponding subspace, and wherein a first edge vector is constructed from a function of a linear combination of the orthonormal basis vector for the corresponding subspace.

7. The method of claim 6 wherein the first edge vector is orthogonal to a second edge vector, wherein a third edge vector is orthogonal to the first edge vector and to the second edge vector, and wherein the third edge vector constructed as a cross product of the first edge vector and the second edge vector.

8. The method of claim 1 wherein calculating directions of the edge vectors comprises using a modified secant method to find the root of the function.

9. The method of claim 1 wherein calculating directions of the edge vectors comprises using a numerical method for finding the root of a nonlinear equation to find the root of the function.

10. The method of claim 1 wherein the distance is calculated using magnitude of the projected vectors.

11. The method of claim 1 further comprising determining shape of a three-dimensional object located near the reference object using two video frames, a point correspondence algorithm, and camera vectors.

12. The method of claim 11 wherein the camera vectors are obtained from the reference object vectors.

13. The method of claim 1 further comprising using the reference object for a three-dimensional mouse by mounting the reference object on a stick and moving the reference object in order to rotate, translate, and scale three-dimensional models on a screen.

14. The method of claim 1 further comprising using the reference object for camera tracking when combining real world video with a virtual world overlay by using the camera vectors.

15. A computer readable medium containing instructions which, when executed in a processing system, causes the processing systems to perform a method for rendering three-dimensional surface, comprising:
  determining projected edge vectors from a viewpoint to a video image of a reference object on a projection plane, the reference object having three orthogonal edges, the projected edge vector corresponding to an edge vector of the reference object;
  generating orthonormal basis vectors for subspaces using the projected edge vectors and a vector from the viewpoint to an intersection of the projected edge vectors;
  calculating directions of the edge vectors;
  calculating distance between the reference object and the viewpoint; and
  determining coordinates of the reference object using the distance between the reference object and the viewpoint.

16. The computer readable medium of claim 15 wherein the reference object is a cube having three edge vectors, wherein a face of the reference cube has one of three different colors, and wherein the adjacent faces have different colors.

17. The computer readable medium of claim 15 further comprising searching all edges in the video image for edges that correspond to the edges of the reference object, the edges having properties of being linear, being edges resulting from a contrast between two of the three colors of the reference cube, and being edges converging to a single point, and wherein the converging point is a corner of the reference cube being closest to the viewpoint.

18. The computer readable medium of claim 15 wherein the edge vector lies within the corresponding subspace, wherein a first edge vector is constructed from a function of a linear combination of the orthonormal basis vector for the corresponding subspace, wherein the first edge vector is orthogonal to a second edge vector, wherein a third edge vector is orthogonal to the first edge vector and to the second edge vector, and wherein the third edge vector constructed as a cross product of the first edge vector and the second edge vector.

19. The computer readable medium of claim 15 wherein calculating directions of the edge vectors comprises using a modified secant method to find the root of the function.

20. The computer readable medium of claim 15 wherein calculating directions of the edge vectors comprises using a numerical method for finding the root of a nonlinear equation to find the root of the function.

21. The computer readable medium of claim 15 wherein the distance is calculated using magnitude of the projected vectors.

22. The computer readable medium of claim 15 further comprising determining shape of a three-dimensional object located near the reference object using two video frames, a point correspondence algorithm, and camera vectors obtained from the reference object vectors.

23. The computer readable medium of claim 15 further comprising using the reference object for a three-dimensional mouse by mounting the reference object on a stick and moving the reference object in order to rotate, translate, and scale three-dimensional models on a screen.

24. The computer readable medium of claim 15 further comprising using the reference object for camera tracking when combining real world video with a virtual world overlay by using the camera vectors.

25. An apparatus, comprising:
  means for determining projected edge vectors from a viewpoint to a video image of a reference object on a projection plane, the reference object having three orthogonal edges, the projected edge vector corresponding to an edge vector of the reference object;
  means for generating orthonormal basis vectors for subspaces using the projected edge vectors and a vector from the viewpoint to an intersection of the projected edge vectors;
  means for calculating directions of the edge vectors;
  means for calculating distance between the reference object and the viewpoint using magnitude of the projected vectors; and
  means for determining coordinates of the reference object using the distance between the reference object and the viewpoint.

26. The apparatus of claim 25 wherein the edge vector lies within the corresponding subspace, wherein a first edge vector is constructed from a function of a linear combination of the orthonormal basis vector for the corresponding subspace, wherein the first edge vector is orthogonal to a second edge vector, wherein a third edge vector is orthogonal to the first edge vector and to the second edge vector, and wherein the third edge vector constructed as a cross product of the first edge vector and the second edge vector.

27. The apparatus of claim 25 wherein means for calculating the directions of the edge vectors comprises means for finding a root of the function using a modified secant method.

28. A system, comprising:
  a memory; and
  a processor coupled to the memory, the processor configured to comprise
    a first logic to determine projected edge vectors from a viewpoint to a video image of a reference object on a projection plane, the reference object having three orthogonal edges, the projected edge vector corresponding to an edge vector of the reference object;

a second logic to generate orthonormal basis vectors for subspaces using the projected edge vectors and a vector from the viewpoint to an intersection of the projected edge vectors;

a third logic to calculate directions of the edge vectors;

a fourth logic to calculate distance between the reference object and the viewpoint using magnitude of the projected vectors; and a fifth logic to determine coordinates of the reference object using the distance between the reference object and the viewpoint.

29. The system of claim 28 wherein the edge vector lies within the corresponding subspace, wherein a first edge vector is constructed from a function of a linear combination of the orthonormal basis vector for the corresponding subspace, wherein the first edge vector is orthogonal to a second edge vector, wherein a third edge vector is orthogonal to the first edge vector and to the second edge vector, and wherein the third edge vector constructed as a cross product of the first edge vector and the second edge vector.

30. The system of claim 28 wherein the third logic to calculate the directions of the edge vectors comprises logic to find a root of the function using a modified secant method.

* * * * *